US012649441B2

(12) United States Patent
Kumar

(10) Patent No.: US 12,649,441 B2
(45) Date of Patent: Jun. 9, 2026

(54) DEVICE AND METHOD FOR CLEANING TWO-WHEELED VEHICLES

(71) Applicant: Sachin Kumar, Cologne (DE)

(72) Inventor: Sachin Kumar, Cologne (DE)

( * ) Notice: Subject to any disclaimer, the term of this patent is extended or adjusted under 35 U.S.C. 154(b) by 0 days.

(21) Appl. No.: 18/211,929

(22) Filed: Jun. 20, 2023

(65) Prior Publication Data

US 2023/0406269 A1 Dec. 21, 2023

Related U.S. Application Data

(63) Continuation of application No. PCT/EP2021/086864, filed on Dec. 20, 2021.

(51) Int. Cl.
*B60S 3/04* (2006.01)
*B60S 3/00* (2006.01)
*B60S 3/06* (2006.01)

(52) U.S. Cl.
CPC .............. *B60S 3/041* (2013.01); *B60S 3/002* (2013.01); *B60S 3/063* (2013.01)

(58) Field of Classification Search
CPC .. B60S 3/002; B60S 3/041; B60S 3/06; B60S 3/063; B08B 3/022; B08B 3/024
USPC ........................................................ 134/123
See application file for complete search history.

(56) References Cited

U.S. PATENT DOCUMENTS 3,279,093 A * 10/1966 Dutton .................... B60S 3/002
417/361
4,393,602 A * 7/1983 Smith ..................... B60S 3/002
15/316.1

5,456,023 A * 10/1995 Farnan .................. F26B 21/004
34/88
5,960,564 A * 10/1999 McElroy ................. B60S 3/002
15/316.1
2005/0102777 A1* 5/2005 Johansson ................. B60S 3/04
134/123
2009/0217955 A1 9/2009 Harrell et al.
2010/0307531 A1* 12/2010 Aharonov ............... B60S 3/041
134/123

(Continued)

FOREIGN PATENT DOCUMENTS

CN 207208020 U * 4/2018 ............. B60S 3/041
DE 9208442 U1 8/1992
DE 4325973 C1 10/1994

(Continued)

OTHER PUBLICATIONS

Backroads, Bike Sizes/Geometry, https://www.backroads.com/why/great-gear/bike-sizing, available Aug. 4, 2020 from www.archive.org. (Year: 2020).*

(Continued)

*Primary Examiner* — Laura C Guidotti
(74) *Attorney, Agent, or Firm* — Stephen J. Kenny; Nicole A. Bustos-Pomerantz; Foley Hoag LLP

(57) ABSTRACT

The invention relates to a device (1) for cleaning two-wheeled vehicles, in particular bicycles and/or electric bicycles. The device (1) has a wet cleaning device for cleaning the two-wheeled vehicle by means of a cleaning liquid and a splash guard housing (2) for retaining the cleaning liquid, wherein during cleaning a two-wheeled vehicle can be at least partially accommodated in the splash guard housing (2). The invention is characterized in that the device (1) comprises a drying means (3).

15 Claims, 6 Drawing Sheets

(56)                    References Cited

U.S. PATENT DOCUMENTS

2020/0361425 A1    11/2020  Kumar

FOREIGN PATENT DOCUMENTS

| | | | | |
|---|---|---|---|---|
| DE | 202008010728 | U1 | 12/2009 | |
| FR | 2976539 | A1 | 12/2012 | |
| WO | WO-86/06693 | A1 | 11/1986 | |
| WO | WO 2017072167 | A1 * | 5/2017 | ............... B60S 3/04 |
| WO | WO-2017/114765 | A1 | 7/2017 | |
| WO | WO-2020/007539 | A1 | 1/2020 | |

OTHER PUBLICATIONS

International Preliminary Report on Patentabilty for Application No. PCT/EP2021/086864 issued Jun. 13, 2023. (English Translation).

International Preliminary Report on Patentabilty for Application No. PCT/EP2021/086864 issued Jun. 13, 2023.

International Search Report and Written Opinion for International Application No. PCT/EP2021/086864 dated Apr. 29, 2022.

Office Action received for German Application No. 10 2020 134 327.2 dated Aug. 10, 2021.

\* cited by examiner

DEVICE AND METHOD FOR CLEANING TWO-WHEELED VEHICLES

This application is a Continuation of and claims the benefit of priority under 35 USC 120 to PCT/EP2021/ 086864 filed Dec. 20, 2021, which claims priority to DE 10 2020 134 327.2 filed Dec. 20, 2020, the entire contents of each are hereby incorporated by reference.

DESCRIPTION

The invention relates to a device for cleaning two-wheeled vehicles, in particular bicycles and/or electric bicycles, and to a method for cleaning two-wheeled vehicles, in particular bicycles and/or electric bicycles, in accordance with the preambles of the independent claims.

Devices and methods of the type in question are known from the prior art, e.g. from WO 2020/007539.

Devices of this kind for cleaning two-wheeled vehicles have a wet cleaning means for cleaning the two-wheeled vehicle by means of a cleaning liquid. The cleaning liquid is typically water, which can contain additives for producing or reinforcing the cleaning effect, such as e.g. surfactants. Furthermore, devices of the type in question have a splash guard housing for retaining the cleaning liquid. During cleaning, the two-wheeled vehicle can typically be accommodated, at least in part, in the splash guard housing. Corresponding methods for cleaning two-wheeled vehicles provide for the two-wheeled vehicle to be cleaned by means of the cleaning liquid during the cleaning cycle.

However, devices of the type in question still have a number of disadvantages. When the two-wheeled vehicle emerges from the device after the cleaning process, it is still covered with water and soap. If it is dried outside the device, it picks up dirt. Moreover, it is necessary to dry the chain before it can be lubricated since it is difficult to apply oil to a wet chain. Devices of the type in question are often used in repair garages for two-wheeled vehicles. There, the two-wheeled vehicles are usually cleaned before repairs are carried out. In this case, it is at least advantageous if the two-wheeled vehicles are dry at the start of the repair.

Thus, in particular, the handling of the two-wheeled vehicle as it is introduced into the device or as the two-wheeled vehicle is removed from the device is associated with the risk of soiling clothing, either with cleaning liquid which continues to adhere to the two-wheeled vehicle or with dirt adhering to the two-wheeled vehicle before cleaning. This particularly applies to electric bicycles, which have a significant dead weight. In order to transmit to the two-wheeled vehicle the force which must be applied to introduce the two-wheeled vehicle into the device or to remove the two-wheeled vehicle from the device, it is typically necessary to position the body close to the two-wheeled vehicle since the corresponding forces cannot be applied with "arms outstretched". The risk that clothing will be soiled increases significantly owing to corresponding positioning of the body close to the two-wheeled vehicle, which becomes necessary as a rule to apply the corresponding forces. After cleaning too, liquid adhering to the two-wheeled vehicle presents a risk to clothing.

It is therefore the underlying object of the invention to indicate a device and a method for cleaning two-wheeled vehicles with which the abovementioned disadvantages do not occur or at least occur to a reduced extent.

The object is achieved by a method and a device having the features of the independent claims. The features of the dependent claims relate to advantageous embodiments.

According to one embodiment of the present invention, the device has a drying means, arranged within the splash guard housing, for drying the two-wheeled vehicle. In connection with the present invention, it has been found to be possible to enable efficient drying of the two-wheeled vehicle by means of drying means arranged within the splash guard housing. In connection with the present invention, it has been found here that such an arrangement of the drying means is possible and even advantageous, especially since it allows a compact construction of the installation, despite the potentially problematic aspects involved, such as the risk of overheating and of moisture within the splash guard housing.

Accordingly, the method for cleaning the two-wheeled vehicle can provide for the two-wheeled vehicle to be dried during a drying cycle by means of an air flow generated within the splash guard housing. In particular, the device can have a control unit which is designed to control the device in such a way that the different cycles of the method are carried out one after the other. The device can have operator control elements for operating the device which are integrated into a handle of the device.

The drying means or the drying cycle have the effect of significantly reducing the residual quantity of liquid which continues to adhere to the two-wheeled vehicle. On the one hand, this reduces the risk of damage to the environment of the device by liquid which continues to adhere to the two-wheeled vehicle and, on the other hand, lowers the risk that clothing will be soiled by liquid adhering to the two-wheeled vehicle.

In particular, the device can have a rotatable brush for cleaning the two-wheeled vehicle. The rotatable brush and/or the drying means can be movable along the two-wheeled vehicle. In this context, the movement can take place in the horizontal and/or vertical direction. In this case, the drying means and the rotatable brush can be arranged on a common mount and can be moved jointly with the latter. Alternatively and/or in addition, however, it is also conceivable that the drying means and the rotating brush can be moved independently of one another. It is likewise possible for there to be a plurality of common mounts for the drying means and the rotating brush. In particular, there can be two mounts of the type in question and one mount can be arranged on each side of a two-wheeled vehicle accommodated in the device. It is self-evident that the device can have a plurality of rotating brushes and/or a plurality of drying means.

Particularly when the device has a plurality of drying means, the total volume flow conveyed by all of the drying means can be, in particular, at least 10 m³/h, in particular at least 50 m³/h and/or at most 500 m³/h. Such a total volume flow has proven suitable for drying a two-wheeled vehicle.

Alternatively and/or in addition, the drying means can be a drying means for drying the two-wheeled vehicle by means of an air flow. In this case, it is possible, in particular, for the drying means to have a heating device for heating the air flow. The heating increases the capacity of the air for absorbing liquid.

The drying means can have a radial blower. In particular, the radial blower can be a low-pressure radial blower. A radial blower and also a radial fan should be understood to mean, in particular, a ventilator which draws in air axially (parallel to the axis of rotation of the impeller) and then blows it out again radially with an offset of 90°. The device is designed, in particular, to operate the radial blower at a rotational speed of at least 1000, preferably at least 2000, and/or at most 5000, revolutions per minute. In this case, the electric power consumption of a radial blower used in the device is, in particular, at least 250 W, preferably at least 400 W, and/or at most 1000 W. It has been found that radial fans operated using these operating parameters offer a sensible relationship between drying performance and the development of heat and thus the technical manageability of drying means arranged within the splash guard housing. Alternatively and/or in addition, other types of low-pressure blowers are also possible.

Alternatively and/or in addition, the drying means can have a side channel compressor. In particular, the side channel compressor can be a medium-pressure side channel compressor. Alternatively and/or in addition, other medium-pressure compressors are likewise possible.

Alternatively and/or in addition, the drying means can have a compressor. The compressor may, in particular, be a high-pressure compressor. Alternatively and/or in addition, other high-pressure generating devices are also possible.

Particularly if it has a medium-pressure compressor and/or a high-pressure compressor, the drying means can have an air blade. An air blade (or alternatively an air knife, air sword, air brush or air doctor) is a device, in particular one with a nozzle having a slot-shaped cross section, which generates a laminar air jet. Alternatively and/or in addition, it is also possible, especially in conjunction with a high-pressure compressor, to use other nozzles. In this case, it is possible, in particular, for the device to be configured in such a way that the nozzles can be used both to generate the air flow of the drying means and also to apply liquid to the two-wheeled vehicle.

It is possible, in particular, for the splash guard housing to be designed to only partially accommodate the two-wheeled vehicle. Devices of the type in question can be implemented in a comparatively compact and space-saving manner if the device, in particular the splash guard housing, is designed to only partially accommodate the two-wheeled vehicle. In particular, this reduces the overall height of the device considerably. In particular, the device or the splash guard housing can be configured in such a way that the handlebar and/or the saddle protrude from the splash guard housing through an opening in the upper side of the latter when the two-wheeled vehicle is accommodated in the device. In this way, although the saddle and/or handlebar are excepted from the cleaning process, it has been found in practice that the handlebar and/or saddle typically are not among the severely soiled regions of a two-wheeled vehicle. Moreover, owing to the materials used there (e.g. leather) or the installed technical components, such as brake lever and shift lever units, intensive wet cleaning of these regions is often not desired in any case.

On its upper side, the splash guard housing can have splash guard elements. In particular, these can be in the form of brushes, the bristles of which are moved toward the two-wheeled vehicle passing through the opening and thus come to abut against said vehicle and form a splash guard. In the past, such bristles have already been used on hinged elements. However, it has been found that when such bristles are folded back after the cleaning of the two-wheeled vehicle, they are typically directed toward the operator of the device and come into contact with the operator or their clothing and may soil them since cleaning liquid typically continues to adhere to the bristles. This can be counteracted if the splash guard elements can be moved in a movement guided by means of a rail system toward the bicycle partially accommodated in the splash guard housing via the opening in the upper side of the splash guard housing. In the case of such guidance of the movement by means of the rail system, a movement is generated in which the bristles are always directed toward the two-wheeled vehicle and thus away from the operator. The risk of soiling the operator and/or their clothing is thus minimized. The rail system may, in particular, be a telescopic rail system. Telescopic rails allow a relatively large travel but can be retracted into a comparatively small overall length.

In particular, the device can have a support arrangement for supporting the front wheel of a two-wheeled vehicle accommodated in the device. The support arrangement can be vertically adjustable relative to the upper side of the device in such a way that the height adjustment of the support arrangement enables the relative position of the handlebar of the two-wheeled vehicle to be adjusted in a vertical direction relative to the upper side of the device.

Particularly if the handlebar is arranged outside the splash guard housing when a two-wheeled vehicle is only partially accommodated in the device, the vertically adjustable support arrangement enables the cleaning effect to be optimized due to the fact that that the two-wheeled vehicle protrudes from the device only to the extent necessary on account of the handlebar. Owing to the different configuration of different two-wheeled vehicles and the consequent variation in the height of the handlebars of the two-wheeled vehicles, in particular owing to different wheel sizes, this extent can vary significantly. Thus, it is also possible, in particular that a racing bike, for example, will require a special setting owing to the bow handlebar that is typically present there.

The vertically adjustable support arrangement can be implemented, in particular, by one or more threaded rods. In particular, threaded rods can be arranged on both sides of the two-wheeled vehicle accommodated in the device. The threaded rods can be coupled to one another in respect of their rotary motion, e.g. by means of a suitable traction means. By rotating the threaded rods, which can be accomplished manually or by means of an electric drive, the support arrangement connected to the threaded rods can be moved upward or downward.

It is possible, in particular, for a wheel rotation unit to be integrated into the support arrangement in order to rotate the front wheel. The device can likewise have a further wheel rotation unit for rotating the rear wheel. The wheel rotation units for rotating the rear and/or front wheel can be coupled by means of a common drive and/or can be drivable independently of one another.

The device can be configured in such a way that the air flow is aligned at an angle of at least 30° and/or at most 80° to the longitudinal direction of a two-wheeled vehicle accommodated in the device. This applies, in particular, to the arrangement of the drying means in the device.

It has been found that such an alignment of the air flow relative to the two-wheeled vehicle leads to particularly efficient drying of the two-wheeled vehicle. In particular, the installation space available in the device is efficiently utilized.

In particular, the drying means can be arranged laterally with respect to and/or below a two-wheeled vehicle accommodated in the device.

Particularly when the device has a plurality of drying means, these can be arranged on both sides of a two-wheeled vehicle accommodated in the device. It has been found that drying means arranged in this way have the advantage that, after the air flows have passed over the two-wheeled vehicle, the air flows of the drying means can still exert a cooling effect on oppositely situated drying means. This contributes considerably to the achievability of adequate drying performance within the splash guard housing.

In particular, the drying means arranged on both sides of a two-wheeled vehicle accommodated in the device are each at a distance of at least 450 mm and/or at most 650 mm from the respective drying means arranged on the other side of the two-wheeled vehicle. If the drying means are movable along the two-wheeled vehicle, then the the above distance should be understood to mean the smallest distance which can be generated by the movement of the drying means.

If the drying means are movable along the two-wheeled vehicle, then the device is, in particular, designed to bring about, in particular to control, the movement in such a way that the drying means on both sides of the two-wheeled vehicle are situated opposite one another and, in particular, are moved in synchronism along the two-wheeled vehicle.

In this case, the drying means are, in particular, aligned in such a way that the drying means, which are situated opposite one another on both sides of the two-wheeled vehicle, are not directed directly at one another. The drying means are preferably aligned in such a way at an angle of less than 80° to the longitudinal direction of a two-wheeled vehicle accommodated in the device that, in particular, the air flow generated by a drying means is not aligned directly with an oppositely situated drying means but, in particular, with an oppositely situated rotatable brush. Given such an alignment, the oppositely situated drying means still continue to benefit from the cooling effect of the air flow but direct moisture entry due to liquid stemming from the two-wheeled vehicle and entrained in the air flow into the oppositely situated drying means is thereby avoided.

In particular, it is advantageous if the drying means have a type of protection of at least IP 66. The use of drying means with this type of protection is advantageous in order to protect the electric components of the drying means from the liquid in the interior of the splash guard housing.

In particular, the drying means, which are, in particular, radial blowers, can be designed and arranged in such a way that the air which they convey is drawn in from below. This has the advantage that there is less entrainment of liquid into the drying means with the aspirated air than if the air is drawn in from other directions. In particular, this protects the motor of the respective drying means since the risk of liquid ingress into the motor housing along the shaft is reduced.

The drying means, which are, in particular, radial blowers, can in particular be designed in such a way and arranged in such a way that the motor of the respective drying means is arranged above the air-conveying region of the drying means. Such an arrangement is likewise advantageous with regard to possible entry of moisture from the airconveying region of the drying means into the motor of the drying means.

The device can be configured in such a way that drying means are arranged at a lower level than outlet nozzles for cleaning liquid and/or rinsing liquid. In this way, it is possible to achieve compact arrangement within the splash guard housing. At the same time, thorough cleaning and drying can be ensured, in which, in particular, the cleaning liquid reaches even high regions of the two-wheeled vehicle. It has been found that the operation of electric drying means within the splash guard housing is possible despite arrangement at a lower level than corresponding outlet nozzles.

Drying means can be arranged one above the other. Drying means arranged one above the other offer the advantage of enabling the two-wheeled vehicle to be dried over its entire height.

At least one drying means, in particular 4 drying means, can be arranged in such a way that the air flow generated by this drying means is directed upward at an angle of at least 2° and/or at most 10° to the horizontal. Such an alignment of a flow generated by a drying means makes it easier to dry the upper regions of the two-wheeled vehicle in an effective manner.

The method for cleaning the two-wheeled vehicle can provide that, during a rinsing cycle, the two-wheeled vehicle is rinsed by means of a rinsing liquid, to which a high-gloss drying agent and/or a chemical drying aid have/has been added. A high-gloss drying agent and/or a chemical drying aid should be understood, in particular, to mean additives that are typically used in the motor vehicle sector, serve to assist surface drying and are designated as such. The rinsing cycle takes place, in particular, between the cleaning cycle and the drying cycle. In particular, such a rinsing cycle increases efficiency but also improves the result of the drying cycle, in particular enabling a significantly shorter duration of the drying cycle.

Furthermore, the method can provide that, during a loading cycle for introducing the two-wheeled vehicle into the device and/or during an unloading cycle for removing the two-wheeled vehicle from the device, the movement of the two-wheeled vehicle relative to the device is assisted and/or brought about by a rotatable brush and/or a wheel rotation unit for rotating the wheels of the two-wheeled vehicle.

Both a wheel rotation unit and a rotating brush can exert a force effect on the two-wheeled vehicle which is suitable for imparting a forward motion to the two-wheeled vehicle. This forward motion can be used to introduce the two-wheeled vehicle into and/or to remove the two-wheeled vehicle from the device. For this purpose, it is possible, in particular, for a loading cycle and/or an unloading cycle, in which no liquid is used, to be provided in the control unit. As an option, the cycle may provide that rotating brushes are positioned at a certain position in the device insofar as these are movable. In this context, it is worthwhile, in particular, if, in a loading cycle, the rotating brushes are positioned in the immediate vicinity of an opening through which the two-wheeled vehicle is introduced into the device. It is correspondingly advantageous if, in the context of an unloading cycle, in which the two-wheeled vehicle is removed from the device, the rotating brush is positioned in the immediate vicinity of the opening through which the two-wheeled vehicle is removed from the device.

Such a loading cycle and/or such an unloading cycle can also be provided in the context of methods for cleaning a two-wheeled vehicle by means of a corresponding device if the method does not have a drying cycle and/or the device does not have a drying means.

To close the opening for the introduction and/or removal of the two-wheeled vehicle, there may be a door in front of the opening, said door being secured on the device by means of hinges. In this case, the hinges are, in particular, configured in such a way that the door is held in a particular open position by the hinges in the open state. This makes it possible to handle the two-wheeled vehicle without simultaneously having to hold the door of the device, e.g. in order to prevent the door from snapping shut. This can be accomplished, for example, by means of hinges which have a corresponding friction and/or latching mechanism, which leads to the door remaining in a particular open position.

In an advantageous embodiment, the drying means can be an air blade which is arranged at an opening for the removal of the two-wheeled vehicle from the device. An air blade arranged in this way makes it possible to ensure that the two-wheeled vehicle necessarily passes the air blade as it is removed from the device. In this case, residues of liquid which adhere to the two-wheeled vehicle are as it were "wiped off" the two-wheeled vehicle.

Further practical embodiments and advantages of the invention are described below in conjunction with the drawings. In the drawings.

Figure 1:
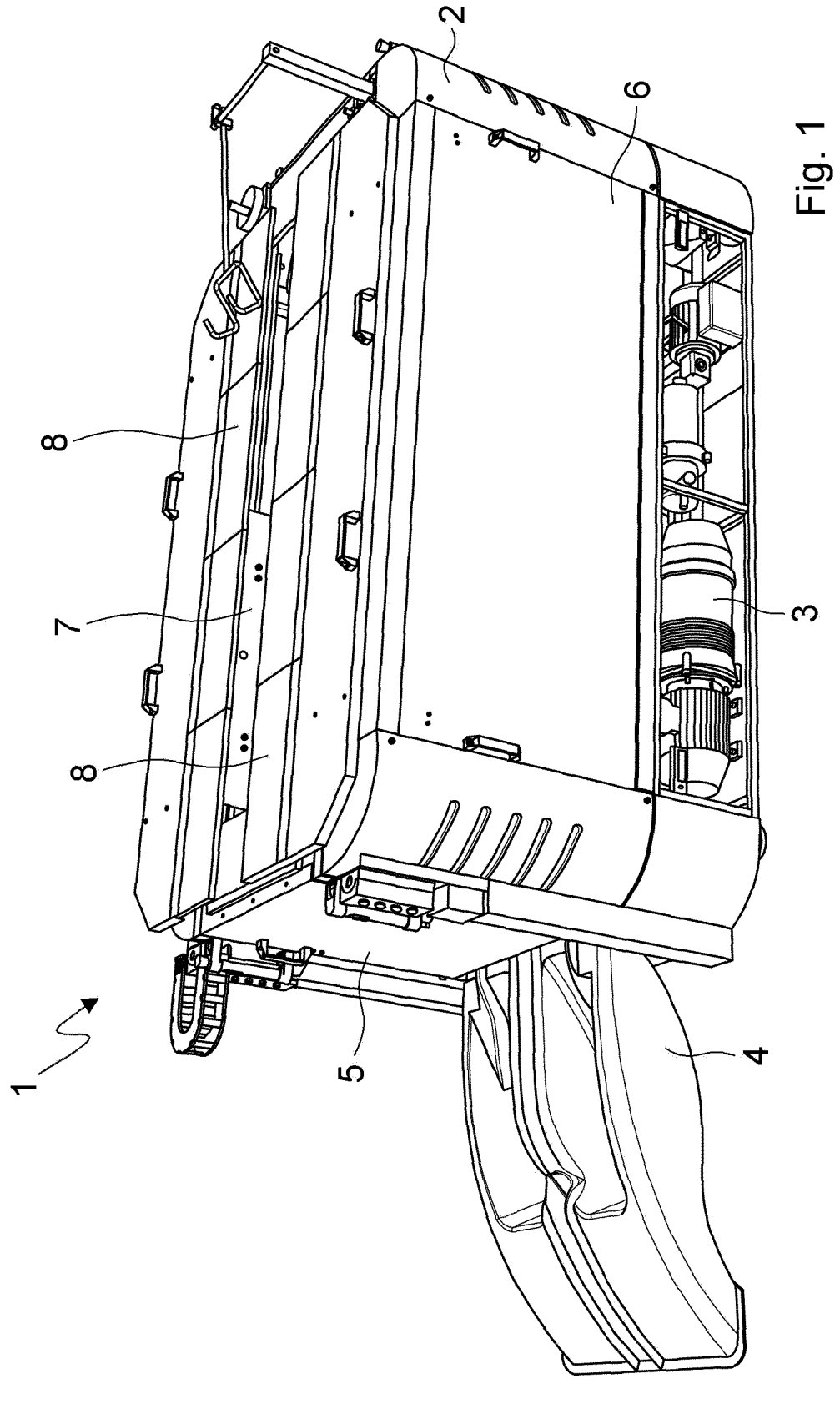
FIG. 1 shows an exemplary device in a perspective view.

Particularly in FIG. 1, it can be seen that the device 1 has a splash guard housing 2. A drying means 3 is arranged within the splash guard housing 2. In the case of the example shown in FIG. 1, the drying means 3 is embodied as a high-pressure compressor. Alternatively and/or in addition, the drying means 3 may also be embodied as a low-pressure blower. This can be seen, in particular, in FIGS. 2, 3, 4 and 5.

It can furthermore be seen in FIG. 1 that the device 1 shown there has a ramp 4 for introducing the two-wheeled vehicle into and/or removing the two-wheeled vehicle from the device. Devices 1 of the type in question can have corresponding ramps 4 at both ends of the device 1, as can be seen, in particular, in FIGS. 2, 3 and 6.

The devices 1 can have doors 5 for closing openings for the introduction and/or removal of the two-wheeled vehicles. In addition, the devices can have closable openings 6 on their longitudinal sides. Such closable openings 6 on the longitudinal sides allow auxiliary manual cleaning and/or drying of the two-wheeled vehicle in the device 1. This can be performed by means of a lance with a corresponding nozzle, for example. The pressure required for this purpose can be provided by the integrated drying means 3, such as that shown by way of example in FIG. 1. To enable the drying means 3 to be seen, a housing part that covers the latter is not shown in FIG. 1.

Figure 5:
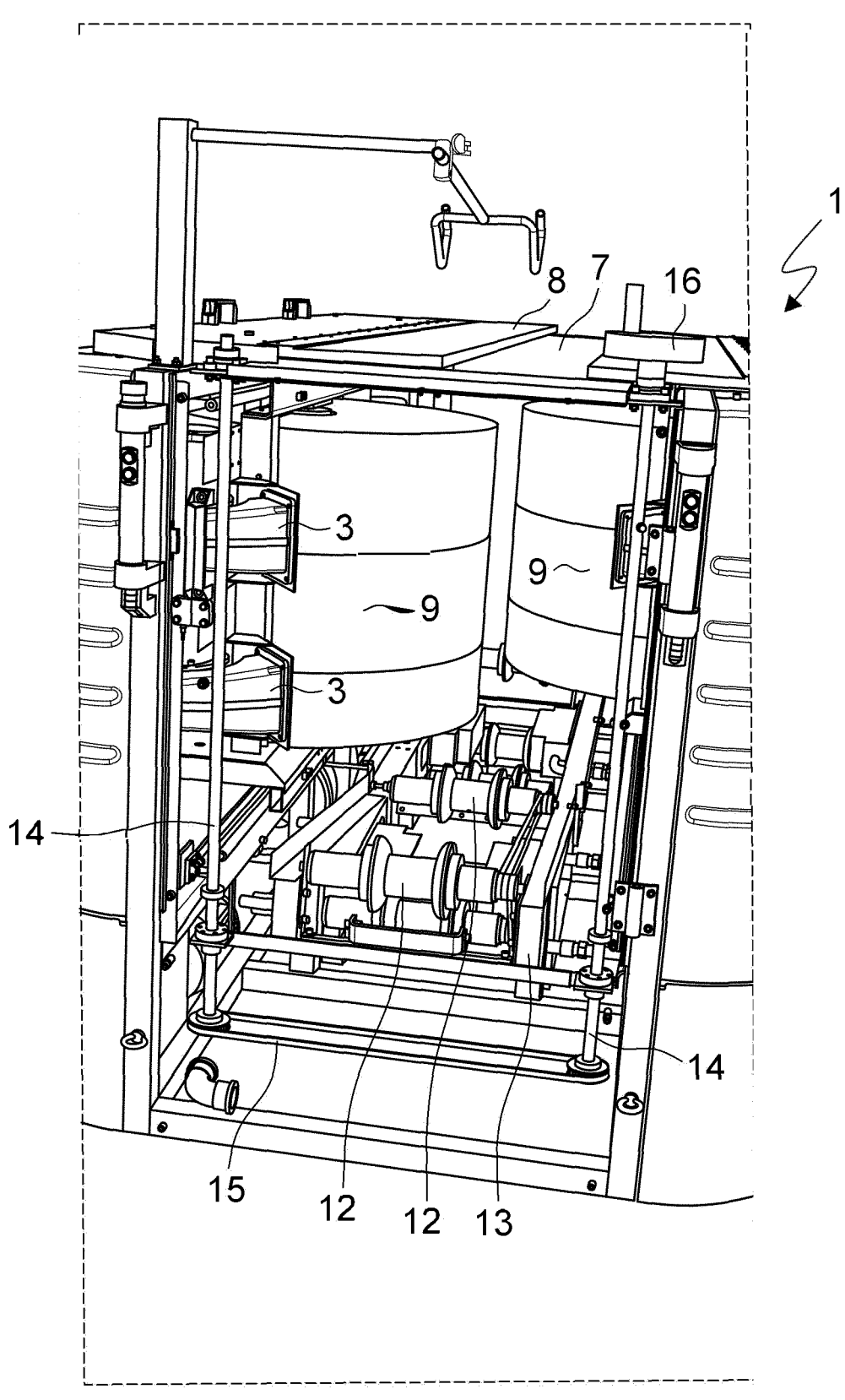
FIG. 5 shows the device from FIG. 4 without the ramp and a number of other parts.
Figure 6:
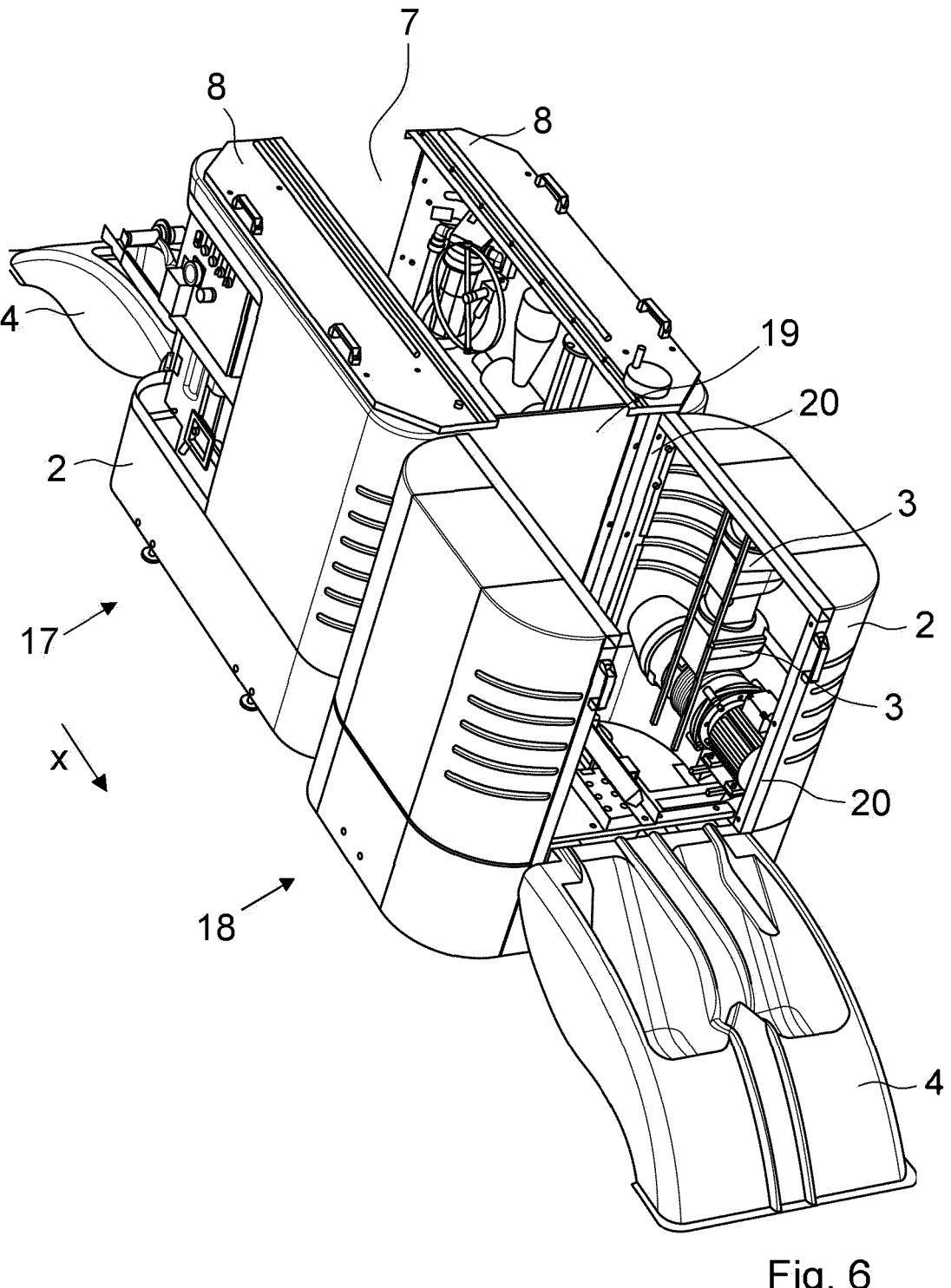
FIG. 6 shows an exemplary device with an alternative design having an additional polishing station.

As can be seen especially in FIGS. 1 and 6, the device can have an opening 7 on its upper side. Through the opening 7 it is possible for a handlebar and/or a saddle of a two-wheeled vehicle accommodated in the device 1 to protrude from the device 1. As can be seen especially in FIGS. 1, 5 and 6, the device 1 can have splash guard elements 8 on its upper side. To close the openings 7, the splash guard elements 8 shown in the examples can be moved toward one another until they come to abut against those parts of a two-wheeled vehicle accommodated in the device which protrude through the opening 7 or until they cover the opening 7, at least substantially. The splash guard elements 8 can have bristles for abutment against the two-wheeled vehicle. The splash guard elements 8 can be guided in their movement by means of telescopic rails.

Figure 2:
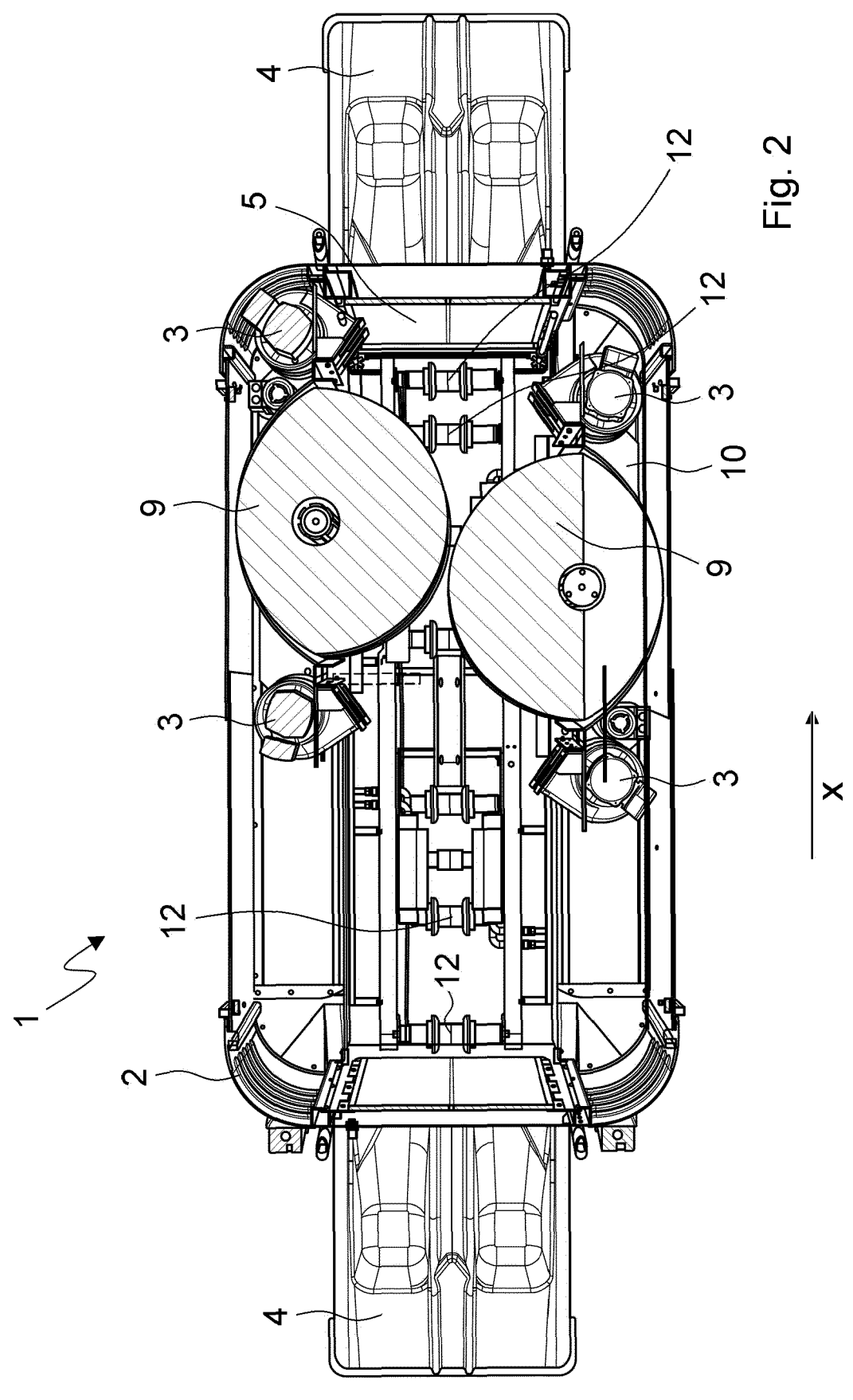
FIG. 2 shows a further exemplary device in section from above.
Figure 3:
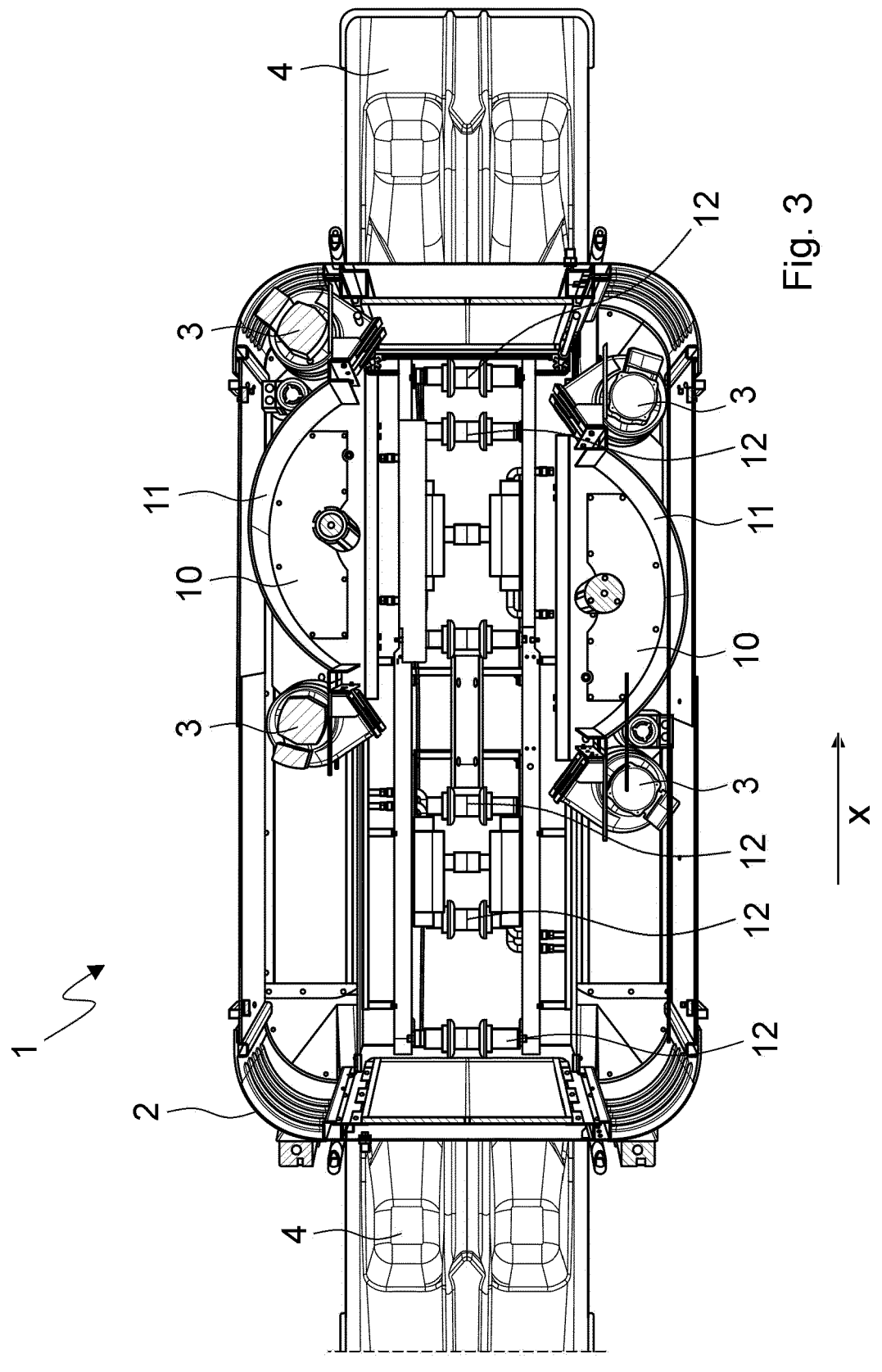
FIG. 3 shows the device from FIG. 2 without the brushes.
Figure 4:
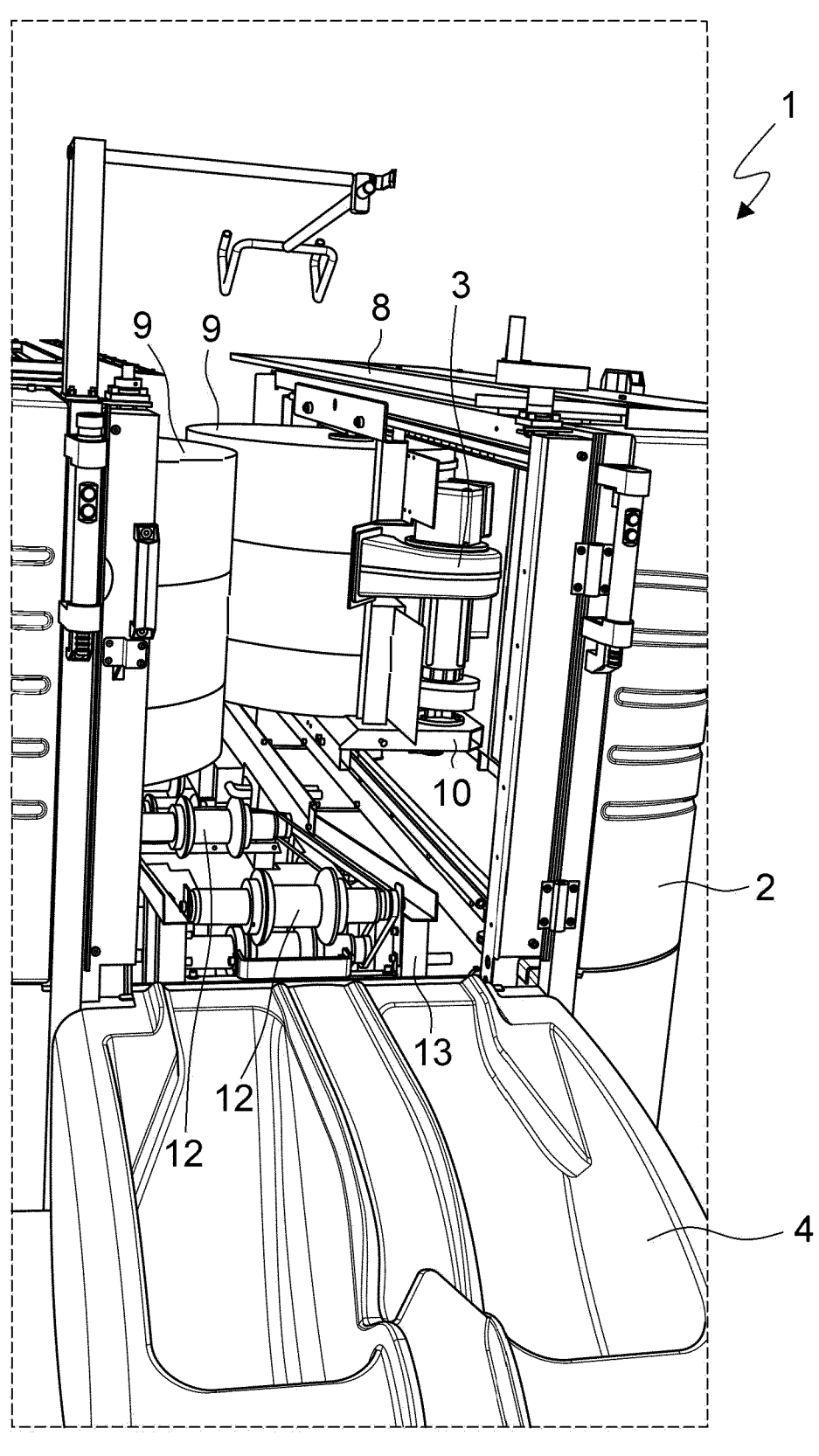
FIG. 4 shows a perspective view into the interior of an exemplary device.

As can be seen especially from the examples in FIGS. 2 and 3, the drying means 3 can be mounted together with rotatable brushes 9 on mounts 10. The mounts 10 are movable, in particular along the longitudinal direction X of a two-wheeled vehicle accommodated in the device 1. For better graphical representation, the movement ranges of the brushes 9 are shown in FIG. 2. In FIG. 3, the brushes are not shown, thus enabling the respective mount 10 to be seen more clearly. Likewise arranged on the mounts 10 are deflector elements 11 for deflecting the bristles of the brushes 9. The deflector elements 11 have the effect that the space in which the bristles of the brush 9 move is not circular but, as can be seen in FIG. 2, is flattened toward the splash guard housing 2. This enables the device 1 to be made narrower.

As can be seen, in particular, in FIG. 3, 8 drying means 3, which are each embodied as radial blowers, can be arranged within the splash guard housing. As can likewise be seen by way of example in FIG. 3, drying means 3 can be arranged one above the other. As can likewise be seen by way of example in FIG. 3, the drying means 3 can be aligned in such a way that they are aligned with a rotatable brush 9 which is situated opposite in relation to the two-wheeled vehicle.

As can be seen in FIGS. 2 to 5, the devices shown by way of example have wheel rotation units 12. As shown in FIGS. 2 to 5, these can be embodied as rotatable rollers.

As can be seen, in particular, in FIG. 5, the device 1 can have a vertically adjustable support arrangement 13. The support arrangement 13 serves to support the front wheel of the two-wheeled vehicle. The support arrangement 13 can be used, in particular, to set the position of the handlebar of the two-wheeled vehicle above the splash guard elements 8. The vertical adjustability of the support arrangement 13 can be achieved by means of rotatable threaded rods 14. As can be seen, in particular, in FIG. 5, these can be arranged on both sides of a two-wheeled vehicle accommodated in the device and can be coupled by a traction means 15. In the example shown, the vertical adjustment of the support arrangement 13 can be brought about manually by means of an actuating device 16 embodied as a handwheel.

FIG. 6 shows an exemplary embodiment which differs from the embodiments shown in FIGS. 1 to 5, in particular in having an additional polishing station 18. The cleaning station 17 is a device 1 for cleaning two-wheeled vehicles, in particular in accordance with the above description, having a wet cleaning means for cleaning the two-wheeled vehicle by means of a cleaning liquid (not shown in FIG. 6), and a splash guard housing 2 for retaining the cleaning liquid. During cleaning, a two-wheeled vehicle can be accommodated, at least in part, in the splash guard housing 2 of the cleaning station 17. The cleaning station 17 has a drying means (not shown in FIG. 6) arranged within the splash guard housing.

As shown in FIG. 6, the cleaning station 17 can be followed by a polishing station 18. This can likewise have a splash guard housing 2. In the case of this embodiment too, direction X shows the longitudinal direction of a two-wheeled vehicle accommodated in the cleaning station 17 and/or the polishing station 18. As in the example shown, the cleaning station 17 and the polishing station 18 can be separated from one another by a splash guard element 19.

Particularly in the case of an embodiment such as that shown in FIG. 6, rotatable polishing brushes can be used as a drying means (not shown in the exemplary FIG. 6 for reasons to do with representational technique) in the polishing station 18. The polishing brushes can have a sponge and/or textile structure in order to remove adhering liquid residues from the two-wheeled vehicle.

As shown by way of example in FIG. 6, drying means 3, in particular drying means embodied as blowers, can be arranged in the splash guard housing 2 of the polishing station 18. The drying means 3 in the polishing station 18 serve, in particular, to keep the polishing brushes dry. The drying means 3 in the polishing station can have a lower type of protection than the drying means 3 in the cleaning station 17 or the device 1 and/or can have a lower type of protection than IP 66.

The device 1 can furthermore have an air blade 20, which can be arranged as a drying means, in particular in the region of an opening for the removal of the two-wheeled vehicle from the device 1. Alternatively and/or in addition, it is also advantageously possible to arrange an air blade 20 in the region of the border between the cleaning station 17 and the polishing station 18, as shown by way of example in FIG. 6.

The features of the invention which are disclosed in the above description, in the drawings and in the claims may be essential, both individually and in any desired combinations, for the implementation of the invention in its various embodiments. The invention is not restricted to the embodiments described. It can be varied within the scope of the claims and taking into account the knowledge of the relevant person skilled in the art.

LIST OF REFERENCE SIGNS

1 device
2 splash guard housing
3 drying means
4 ramp
5 door
6 closable opening
7 opening
8 splash guard element
9 brush
10 mount
11 deflector elements
12 wheel rotation unit
13 support arrangement
14 threaded rod
15 traction means
16 actuating device
17 cleaning station
18 polishing station
19 splash guard element
20 air blade
X longitudinal direction of the two-wheeled vehicle

The invention claimed is:

1. A device (1) for cleaning two-wheeled vehicles, the device comprising:
   a wet cleaning means for cleaning the two-wheeled vehicle by means of a cleaning liquid, and
   a splash guard housing (2) for retaining the cleaning liquid,
      wherein a two-wheeled vehicle can be at least partially accommodated in the splash guard housing (2) during cleaning, and
   a plurality of drying means (3) arranged within the splash guard housing (2) on both sides of the two-wheeled vehicle accommodated in the device (1),
      wherein the plurality of drying means (3) is configured for drying the two-wheeled vehicle by means of an air flow, and
      wherein the device (1) is configured with the plurality of drying means (3) arranged with the air flow aligned at an angle of at most 80° relative to a longitudinal direction of a two-wheeled vehicle accommodated in the device (1),
   wherein the plurality of drying means (3) includes a first and second drying means, with the first drying means arranged above the second drying means (3), with the air flow generated by the first drying means (3) directed upward at an angle of at least 2° and at most 10° relative to the horizontal, and wherein the plurality of drying means (3) includes a motor arranged above an air-conveying region of the plurality of drying means (3).

2. The device (1) as claimed in claim 1, wherein the device has a rotatable brush (9), arranged within the splash guard housing (2), for cleaning the two-wheeled vehicle.

3. The device of claim 2, wherein the rotatable brush is configured to be moveable along the two-wheeled vehicle.

4. The device of claim 3, wherein the rotatable brush is moveable in the vertical direction.

5. The device (1) as claimed in claim 1, wherein each of the plurality of drying means (3) has a radial blower, and wherein the device (1) is designed to operate the radial blower at a rotational speed of between 1000 and 5000 revolutions per minute.

6. The device (1) as claimed in claim 1, wherein the splash guard housing (2) is designed to only partially accommodate the two-wheeled vehicle.

7. The device (1) as claimed in claim 1, wherein the device (1) is configured with the plurality of drying means (3) arranged with the air flow aligned at an angle of at least 30° relative to the longitudinal direction of a two-wheeled vehicle accommodated in the device (1).

8. The device (1) as claimed in claim 1, wherein at least one drying means (3) of the plurality of drying means is arranged below a two-wheeled vehicle accommodated in the device (1).

9. The device (1) as claimed in claim 1, wherein the plurality of drying means (3) are arranged at a distance between 450 mm and 650 mm on both sides of a two-wheeled vehicle accommodated in the device (1).

10. The device (1) as claimed in claim 1, wherein the plurality of drying means (3) are arranged at a lower level than outlet nozzles for a cleaning liquid and/or a rinsing liquid.

11. The device (1) as claimed in claim 1, wherein a total volume flow conveyed by the plurality of drying means (3) of the device (1) is between 50 m$^3$/h and 300 m$^3$/h.

12. The device (1) as claimed in claim 1, wherein the plurality of drying means (3) is movable along the two-wheeled vehicle.

13. The device (1) as claimed in claim 1, wherein the splash guard housing includes:
   a vehicle entrance,
   a vehicle exit,
   opposing sides spaced apart a distance to at least partially accommodate a two-wheeled vehicle,
   a top portion and
   a bottom portion;
   wherein the top portion includes an opening defined therein, the opening extending from the vehicle entrance to the vehicle exit and configured for a handlebar of the two-wheeled vehicle to protrude from the device as the two-wheeled vehicle moves from the vehicle entrance to the vehicle exit.

14. A method for cleaning two-wheeled vehicles, the method comprising:
   providing the device (1) according to claim 1,
   wherein the two-wheeled vehicle is cleaned by means of a cleaning liquid during a cleaning cycle,
   wherein the two-wheeled vehicle is accommodated at least partially in a splash guard housing (2) during cleaning, and
   wherein the two-wheeled vehicle is dried during a drying cycle by means of an air flow generated within the splash guard housing (2).

15. The method as claimed in claim 14, further comprising a rinsing cycle carried out between the cleaning cycle and the drying cycle, the rinsing cycle including a rinsing liquid, wherein the rinsing liquid includes a high-gloss drying agent and/or a chemical drying aid.

* * * * *